(12) United States Patent
Ikeno

(10) Patent No.: US 8,642,674 B2
(45) Date of Patent: Feb. 4, 2014

(54) METHOD FOR CURING ADDITION CURABLE ORGANOPOLYSILOXANE COMPOSITION

(71) Applicant: Shin-Etsu Chemical Co., Ltd., Tokyo (JP)

(72) Inventor: Masayuki Ikeno, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/653,486

(22) Filed: Oct. 17, 2012

(65) Prior Publication Data

US 2013/0096223 A1   Apr. 18, 2013

(30) Foreign Application Priority Data

Oct. 18, 2011   (JP) .................. 2011-229118

(51) Int. Cl.
  *C08J 3/28*  (2006.01)
  *C08F 2/46*  (2006.01)
  *C08G 61/04*  (2006.01)

(52) U.S. Cl.
  USPC .................. 522/148; 522/1; 520/1

(58) Field of Classification Search
  USPC .................. 522/148, 1; 520/1
  See application file for complete search history.

(56) References Cited

U.S. PATENT DOCUMENTS

| | | | |
|---|---|---|---|
| 4,510,094 A | 4/1985 | Drahnak | |
| 4,530,879 A * | 7/1985 | Drahnak | 428/352 |
| 4,916,169 A | 4/1990 | Boardman et al. | |
| 5,145,886 A | 9/1992 | Oxman et al. | |
| 6,046,250 A | 4/2000 | Boardman et al. | |
| 6,150,546 A | 11/2000 | Butts | |
| 6,376,569 B1 | 4/2002 | Oxman et al. | |
| 7,192,795 B2 | 3/2007 | Boardman et al. | |
| 2008/0033071 A1 | 2/2008 | Irmer et al. | |
| 2008/0193749 A1 | 8/2008 | Thompson et al. | |
| 2008/0203415 A1 | 8/2008 | Thompson et al. | |
| 2011/0196096 A1 | 8/2011 | Angermaier et al. | |

FOREIGN PATENT DOCUMENTS

| | | |
|---|---|---|
| DE | 10 2008 043 316 A1 | 5/2010 |
| JP | 2008-521252 A | 6/2008 |
| JP | 2010-519573 A | 6/2010 |

OTHER PUBLICATIONS

Extended European Search Report issued Feb. 15, 2013, in European Patent Application No. 12188653.5.

* cited by examiner

*Primary Examiner* — Ling Choi
*Assistant Examiner* — Jessica E Whiteley
(74) *Attorney, Agent, or Firm* — Birch, Stewart, Kolasch & Birch, LLP

(57) ABSTRACT

A method for curing an addition curable organopolysiloxane composition is provided. This method uses a UV activatable platinum catalyst (complex), and this method has enabled consistent curing of the parts where UV exposure is impossible as well as consistent curing of a thick article. This method cures an addition curable organopolysiloxane composition comprising (A) an organopolysiloxane having at least 2 alkenyl groups bonded to silicon atoms per molecule, (B) an organohydrogenpolysiloxane having at least 2 hydrogen atoms bonded to silicon atoms per molecule, and (C) an effective amount of a photoactivatable platinum complex curing catalyst, and the method comprises the first step of exposing the composition to UV to increase catalytic activity of the component (C), and the second step of applying the composition obtained in the first step to a desired position and curing the composition.

1 Claim, 1 Drawing Sheet

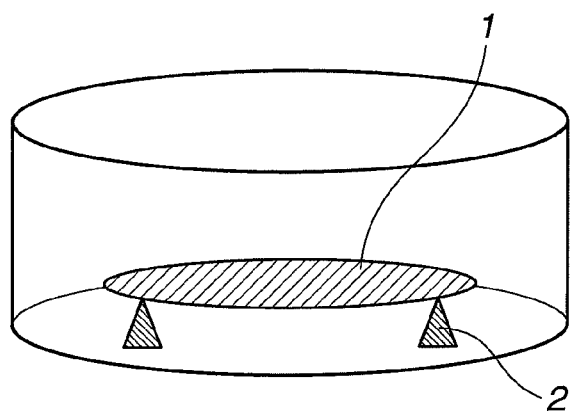

METHOD FOR CURING ADDITION CURABLE ORGANOPOLYSILOXANE COMPOSITION

CROSS-REFERENCE TO RELATED APPLICATION

This non-provisional application claims priority under 35 U.S.C. §119(a) on Patent Application No. 2011-229118 filed in Japan on Oct. 18, 2011, the entire contents of which are hereby incorporated by reference.

TECHNICAL FIELD

This invention relates to a method for curing an addition curable organopolysiloxane composition wherein the composition is cured by the curing of an organopolysiloxane having aliphatic unsaturated groups and an organopolysiloxane having hydrogen atoms bonded to silicon atoms using a platinum catalyst which can be activated by ultraviolet light.

BACKGROUND ART

Addition curable silicone rubber compositions which are curable by using a platinum compound for the curing catalyst have found various applications in view of their excellent curability. The addition curable silicone rubber compositions can be used both as millable type and liquid type compositions, and they are used in a wide variety of applications. In particular, the liquid type compositions are used for an adhesive, moulage materials, materials used in LIMS (liquid injection molding system), and other applications. In either case, the crosslinking is accelerated by the mixing and/or heating of the composition to obtain the rubber cured product.

Conventional one-part addition curable type compositions use a curing regulator agent to realize storage stability before the use, and heating was necessary for the curing. This heating is associated with the heating of the metal and resin parts to which the composition is adhered. There is a demand for reducing the energy and time required for the heating.

In view of such situation, moisture curable silicone rubber compositions using dealcoholization/deoxime reaction and UV curable silicone rubber compositions using (meth)acrylic functional group, epoxy group, or the like have also been proposed. However, the moisture curable silicone rubber compositions suffered from the problem of extremely long time required for the curing. In the case of the UV curable silicone rubber compositions, shadow part where light (UV) can not reach remained uncured while the curing could be accomplished in shorter time.

On the other hand, JP-A 2008-521252 and JP-A 2010-519573 disclose curing of an addition curable silicone composition using a platinum catalyst (complex) which catalytically accelerates addition curing by exposure to UV. In these cases, the composition is first applied to the desired site, and then cured by UV irradiation. As a consequence, these methods had the problem that the shadow part where exposure to the light (UV) is not possible could not be cured, and in the case of a thick article, consistent curing in the interior was also difficult.

SUMMARY OF INVENTION

The present invention has been completed in view of the situation as described above, and an object of the present invention is to provide a method for curing an addition curable organopolysiloxane composition using a platinum catalyst (complex) that can be activated by UV irradiation, which enables consistent curing of the part where exposure to the UV irradiation is not possible as well as consistent curing of a thick article.

In order to achieve such objects, the inventors of the present invention carried out an extensive study and found that, when an addition curable organopolysiloxane composition containing a platinum complex curing catalyst which is to be activated by UV irradiation is exposed to UV to increase the catalytic activity of the catalyst and thereafter applied to the desired site and cured, consistent curing of the composition is realized even in the part where exposure to UV is not possible and in the case of a thick article. The present invention has been completed on the basis of such finding.

Accordingly, the present invention provides a method for curing an addition curable organopolysiloxane composition comprising (A) an organopolysiloxane having at least 2 alkenyl groups bonded to silicon atoms per molecule, (B) an organohydrogenpolysiloxane having at least 2 hydrogen atoms bonded to silicon atoms per molecule at an amount such that 0.4 to 10 hydrogen atoms bonded to silicon atoms of this component are present per one alkenyl group in the organopolysiloxane of the component (A), and (C) an effective amount of a platinum complex curing catalyst which is to be activated by ultraviolet light irradiation, the method comprising the first step of exposing the composition to UV to increase catalytic activity of the component (C), and the second step of applying the composition obtained in the first step to desired parts and curing the composition.

In this case, platinum complex curing catalyst (C) is preferably a platinum complex having a β-diketone platinum complex or cyclic diene compound as its ligand.

Advantageous Effects of Invention

The present invention has enabled consistent curing of an addition curable organopolysiloxane composition even in the parts where exposure to the light is not possible and in the case of thick articles.

BRIEF DESCRIPTION OF DRAWING

FIG. 1 is a schematic view showing a container used in Examples and Comparative Examples of the present invention.

DESCRIPTION OF EMBODIMENTS

The method for curing an addition curable organopolysiloxane composition of the present invention comprises the first step of exposing the composition comprising (A) an organopolysiloxane having at least 2 alkenyl groups bonded to silicon atoms per molecule, (B) an organohydrogenpolysiloxane having at least 2 hydrogen atoms bonded to silicon atoms per molecule, and (C) a photoactivatable platinum complex curing catalyst, to UV to thereby increase catalytic activity of the component (C), and the second step of applying the composition obtained in the first step to desired parts and curing the composition.

In the present invention, the photoactivatable platinum complex curing catalyst means a platinum complex curing catalyst which is to be activated by UV light irradiation.

The organopolysiloxane composition used in the present invention contains an organopolysiloxane having at least 2 alkenyl groups bonded to silicon atoms per molecule as the component (A). The organopolysiloxane of the component (A) contains at least 2, and preferably 2 to 20 alkenyl groups bonded to silicon atoms per molecule, and it may have non-limited molecular structure such as straight chain, branched, cyclic, or network structure. The organopolysiloxane may be a polymer comprising single type of siloxane units or a copolymer comprising two or more types of siloxane units.

The organopolysiloxane of the component (A) is preferably the one represented by the following general formula (1):

$$R^1_a SiO_{(4-a)/2} \quad (1)$$

wherein $R^1$ is a substituted or unsubstituted monovalent hydrocarbon group preferably containing 1 to 12 carbon atoms and more preferably containing 1 to 10 carbon atoms, and a is a positive number of 1.0 to 2.2, and more preferably 1.95 to 2.05.

The organic group in the organopolysiloxane of the component (A) ($R^1$ in the general formula (1)) includes an alkenyl group, and exemplary alkenyl groups include vinyl group, allyl group, isopropenyl group, butenyl group, and pentenyl group. The preferred are vinyl group and allyl group, and the most preferred is vinyl group in view of the ease of synthesis and chemical stability.

Preferable organic groups other than the alkenyl group are substituted or unsubstituted monovalent hydrocarbon groups not containing an aliphatic unsaturated bond. Exemplary such groups include alkyl groups such as methyl group, ethyl group, propyl group, isopropyl group, butyl group, hexyl group, octyl group, and dodecyl group; cycloalkyl groups such as cyclopentyl group, cyclohexyl group, and cycloheptyl group; aryl groups such as phenyl group, tolyl group, xylyl group, and naphthyl group; aralkyl groups such as benzyl group, phenylethyl group, and phenylpropyl group; and any one of such monovalent hydrocarbon groups having at least one of its hydrogen atoms substituted with fluorine atom, chlorine atom, or nitrile group such as trifluoropropyl group, chloromethyl group, and cyanoethyl group.

The organic group ($R^1$) in the formula (1) may comprise the same or different groups. However, in view of chemical stability and ease of synthesis, at least 90% by mole of all the organic group ($R^1$), and in particular, all of the organic group other than the alkenyl group is preferably methyl group. When required in view of the property of the resulting product, use of an organic group containing phenyl group, or trifluoropropyl group in addition to methyl group is also preferable.

Content of the alkenyl group in the organopolysiloxane of the component (A) is preferably 0.000010 to 0.0010 mol/g, and in particular, 0.000025 to 0.0005 mol/g.

The organopolysiloxane of the component (A) may have a viscosity at 25° C. of preferably at least 10 mPa·s, more preferably 50 to 5,000,000 mPa·s, and most preferably 100 to 1,000,000 mPa·s. When the viscosity is too low, the cured product may become brittle, while excessively high viscosity may result in the high viscosity of the resulting composition which may invite poor workability. The viscosity is the value measured by a rotary viscometer, and this also applies to the following description.

Single organopolysiloxane or a combination of two or more organopolysiloxanes may be used for the component (A).

The organopolysiloxane composition used in the present invention contains an organohydrogenpolysiloxane having at least 2 hydrogen atoms bonded to silicon atoms per molecule as the component (B). The organohydrogenpolysiloxane of the component (B) is an organohydrogenpolysiloxane containing at least 2 hydrogen atoms bonded to silicon atoms per molecule, which functions as a crosslinking agent when the alkenyl group bonded to silicon atoms in the component (A) and the hydrogen atom bonded to silicon atoms (SiH groups) in the component (B) reacts in the presence of the platinum complex curing catalyst of the component (C) as described below to form a three-dimensional network structure.

The organohydrogenpolysiloxane may have a non-limiting molecular structure such as straight chain, branched, cyclic, or network structure, and it may be a polymer solely comprising the siloxane unit having silicon-hydrogen bond or a copolymer of a siloxane unit having silicon-hydrogen bond and at least one member selected from triorganosiloxy unit, diorganosiloxane unit, monoorganosiloxane unit, and $SiO_2$ unit.

The organohydrogenpolysiloxane of the component (B) is the one represented by the following general formula (2):

$$R^2_b H_c SiO_{(4-b-c)/2} \quad (2)$$

wherein $R^2$ is a substituted or unsubstituted monovalent hydrocarbon group preferably containing 1 to 12 carbon atoms and more preferably containing 1 to 10 carbon atoms, b is a positive number of 0.7 to 2.0, c is positive number of 0.002 to 1.2, with b+c being 0.8 to 3.0, and more preferably, b is 0.9 to 2.0, c is 0.01 to 1.0, with b+c being 1.0 to 3.0.

The organic group in the organohydrogenpolysiloxane of the component (B) ($R^2$ in the general formula (2)) is preferably the one not having an aliphatic unsaturated group, and examples are those mentioned for the organic group other than the alkenyl group of the component (A) as described above. The organic group ($R^2$) in the formula (2) may be the same or different. However, in view of chemical stability and ease of synthesis, at least 90% by mole of all the organic group ($R^1$), and in particular, all of the organic group is preferably methyl group. When required in view of the property of the resulting product, use of an organic group containing phenyl group, or trifluoropropyl group in addition to methyl group is also preferable.

The number of hydrogen atoms bonded to silicon atoms (SiH groups) in the organohydrogenpolysiloxane molecule is at least 2, preferably at least 3, more preferably 3 to 200, and even more preferably 4 to 100.

The degree of polymerization is not particularly limited. However, the organohydrogenpolysiloxane is preferably the one containing 2 to 300, and in particular 4 to 150 silicon atoms in view of the compatibility with the component (A) and ease of synthesis. Single organohydrogenpolysiloxane or a combination of two or more organohydrogenpolysiloxanes may be used for the component (B).

In the organopolysiloxane composition used in the present invention, the component (B) may be incorporated at an amount such that 0.4 to 10 mole of hydrogen atoms bonded to silicon atoms (SiH groups), and preferably 0.5 to 5.0 mole of SiH group of this component are present per one mole of the alkenyl group in the organopolysiloxane of the component (A). When the amount of the component (B) is below such range, insufficient curing may invite poor strength of the cured product while the amount in excess of such range may lead to foaming during the curing and change of the physical properties with the time.

The organopolysiloxane composition used in the present invention contains a photoactivatable platinum complex curing catalyst as the component (C). The photoactivatable platinum complex curing catalyst exhibits catalytic function when activated by light (UV) to promote addition reaction between the component (A) and the component (B). Examples of the compound which may be used as the photoactivatable platinum complex curing catalyst of the component (C) include β-diketone platinum complex and platinum complex having a cyclic diene compound as the ligand.

Examples of such platinum complex are disclosed, for example, in U.S. Pat. No. 6,376,569, U.S. Pat. No. 4,916,169, U.S. Pat. No. 6,046,250, U.S. Pat. No. 5,145,886, U.S. Pat. No. 6,150,546, U.S. Pat. No. 4,530,879, and U.S. Pat. No. 4,510,094.

Examples of the β-diketone platinum complex include: trimethyl(acetylacetonato)platinum complex, trimethyl(2,4-pentanedionato)platinum complex, trimethyl(3,5-heptanedionato)platinum complex, trimethyl(methylacetoacetato)platinum complex, bis(2,4-pentanedionato)platinum complex, bis(2,4-hexanedionato)platinum complex, bis(2,4-heptanedionato)platinum complex, bis(3,5-heptanedionato) platinum complex, bis(1-phenyl-1,3-butanedionato)platinum complex, and bis(1,3-diphenyl-1,3-propanedionato) platinum complex.

Examples of the platinum complex having a cyclic diene compound as its ligand include: (1,5-cyclooctadienyl)dimethyl platinum complex, (1,5-cyclooctadienyl)diphenyl platinum complex, (1,5-cyclooctadienyl)dipropyl platinum complex, (2,5-norbornadiene)dimethyl platinum complex, (2,5-norbornadiene)diphenyl platinum complex, (cyclopentadienyl)dimethyl platinum complex, (methylcyclopentadienyl)diethyl platinum complex, (trimethylsilylcyclopentadienyl)diphenyl platinum complex, (methycycloocta-1,5-dienyl)diethyl platinum complex, (cyclopentadienyl)trimethyl platinum complex, (cyclopentadienyl)ethyldimethyl platinum complex, (cyclopentadienyl) acetyldimethyl platinum complex, (methylcyclopentadienyl) trimethyl platinum complex, methylcyclopentadienyl) trihexyl platinum complex, (trimethylsilyl cyclopentadienyl) trimethyl platinum complex, (dimethylphenylsilylcyclopentadienyl)triphenyl platinum complex, and (cyclopentadienyl)dimethyltrimethylsilylmethyl platinum complex.

In the organopolysiloxane composition used in the present invention, content of the component (C) may be a catalytically active amount. For example, the component (C) may be used preferably at 1 to 1,000 ppm, and more preferably at 5 to 500 ppm in terms of platinum metal in relation to total weight of the component (A) and the component (B). Use at an excessively small amount may result in the retarded curing while excessive use may be economically disadvantageous.

Other Components

In the organopolysiloxane composition used in the present invention, other optional components may be added in addition to the components as described above at an amount not adversely affecting the merits of the present invention.

Incorporation of a reaction regulator agent is particularly preferable in order to regulate the time between the preparation and the application of the composition obtained in the first step to the desired site. In the case of the composition with relatively small number of crosslinking point which would give a silicone gel when cured, use of the reaction regulator agent may not be necessary. However, in the case of a composition having many crosslinking point which would give a silicone rubber after the curing, use of the reaction regulator agent is preferable in view of improving the workability. The reaction regulator agent is not particularly limited, and examples include an acetylene compound, maleic acid derivative, and the like. The effect of postponing the curing by this compound may greatly vary by its chemical structure, and the amount used should be adequately adjusted for the each component. However, use at 0.0001 to 10 parts by weight, and in particular, 0.001 to 3 parts by weight in relation to 100 parts by weight of the component (A) is preferable.

Examples of other optional components include inorganic fillers such as fumed silica, precipitated silica, crystalline silica, hollow filler, silsesquioxane, fumed titanium dioxide, magnesium oxide, zinc oxide, iron oxide, aluminum hydroxide, magnesium carbonate, calcium carbonate, zinc carbonate, laminar mica, carbon black, diatomaceous earth, and glass fiber; fillers produced by a surface treatment of such filler with an organosilicon compound such as an organoalkoxysilane compound, organochlorosilane compound, organosilazane compound, or low molecular weight siloxane compound; silicone rubber powder; and silicone resin powder.

The composition as described above may also contain anti-creep-hardening agent, plasticizer, heat-resisting additive, thixotropic agent, pigment, dye, antimold, and the like to the extent not adversely affecting the object of the present invention.

The addition curable organopolysiloxane composition may be prepared by mixing the components as described above by a method commonly used in the art.

The curing method of the present invention comprises the first step wherein the addition curable organopolysiloxane composition is exposed to UV to increase catalytic activity of the component (C), and the second step wherein the composition having its catalytic activity increased in the first step is coated or potted at the desired parts for curing. These two steps enable consistent curing of the composition of the present invention not only at the surface of the article but in the interior of the article.

In the first step, the entire composition may be exposed to the UV before applying the composition to the desired parts, for example, by potting. Alternatively, a part of the composition may be exposed to the UV while continuously applying the exposed part of the composition to the desired parts, for example, by potting.

The lamp used for the UV exposure is not particularly limited as long as it is capable of providing a UV light having a wavelength of 200 to 400 nm. Exemplary such lights include low pressure mercury lamp, medium pressure mercury lamp, high pressure mercury lamp, xenon lamp, metal halide lamp, and UV LED lamp.

The UV exposure may be at an amount sufficient for activating the photoactivatable platinum complex although the amount may vary depending on the type and amount of the photoactivatable platinum complex used. Preferably, UV at an intensity of 10 to 1,000 mW/cm$^2$, and in particular, 20 to 400 mW/cm$^2$ is irradiated for 0.5 seconds to about 5 minutes, and in particular, for 1 second to about 1 minute.

The curing of the second step may be conducted at room temperature. However, the curing may be conducted at an elevated temperature of 30° C. to 100° C. when faster completion of the curing is desired.

EXAMPLES

Next, the present invention is described in further detail by referring to Examples and Comparative Examples, which by no means limit the scope of the invention. In the following description, the viscosity was measured by a rotary viscometer at 25° C.

Example 1

100 parts by weight of dimethylpolysiloxane having opposite ends of the molecular chain capped with vinyldimethylsilyl group having a viscosity of about 1,000 mPa·s; 2.2 parts by weight of dimethylsiloxane-methylhydrogen siloxane copolymer having hydrogen atoms bonded to silicon atoms at the end and in the side chain of the molecule (content of the hydrogen atoms bonded to silicon atoms=0.55% by weight) and having a viscosity of 12 mPa·s; and 0.12 part by weight of a 2-(2-butoxyethoxy)ethyl acetate solution containing 0.4% by weight of bis(2,4-pentanedionato)platinum complex in terms of platinum atom were mixed to thereby prepare composition A.

Composition A (8 g) was exposed to UV at 100 mW/cm$^2$ for 5 seconds using UV exposure system model SP-V equipped with a uniform exposure unit (manufactured by USHIO). At this stage, the composition A was a liquid. This reaction mixture (composition A) was quickly poured into the container of FIG. 1 (in FIG. 1, "1" designates an aluminum plate, and "2" designates a spacer), and the mixture was allowed to stand for 1 hour at room temperature. Then, the composition A was observed for its curing. The entire mixture was consistently cured including the part covered by the aluminum plate which was not exposed to the UV. The cured product had a hardness (measured by IRHD hardness tester Supersoft) of 70, and the hardness was 84 after 24 hours.

The container of FIG. 1 was as described below.

Glass dish: diameter 33 mm, depth 10 mm.

An aluminum plate having a diameter of 20 mm and a thickness 0.3 mm was placed in the center of the glass dish with a spacer having a height of 1 mm.

Example 2

The procedure of Example 1 was repeated except that the bis(2,4-pentanedionato)platinum complex was replaced with 0.05 part by weight of isooctane solution containing 1% by weight (in terms of platinum atom) of (methylcyclopentadienyl)trimethyl platinum complex, and 0.01 part by weight of tetravinyltetramethylcyclotetrasiloxane to thereby prepare composition B.

Composition B (8 g) was exposed to UV at 20 mW/cm$^2$ for 2 seconds by the exposure system used in Example 1. This reaction mixture (composition B) was quickly poured into the container shown in FIG. 1, and the mixture was allowed to stand for 1 hour at room temperature. Then, the composition B was observed for its curing. The entire mixture was consistently cured including the part covered by the aluminum plate which was not exposed to the UV. The cured product had a hardness (measured by IRHD hardness tester Supersoft) of 73, and the hardness was 84 after 24 hours.

Comparative Example 1

Composition A (8 g) obtained in Example 1 was poured into the container shown in FIG. 1, and the composition was exposed to UV at 100 mW/cm$^2$ for 5 seconds by the exposure system used in Example 1. This reaction mixture was allowed to stand for 1 hour at room temperature, and the composition A was observed for its curing. The part covered by the aluminum plate which was not exposed to UV remained uncured while the UV-exposed part on the aluminum plate was cured. The cured part had a hardness (measured by IRHD hardness tester Supersoft) of 70.

Comparative Example 2

Composition B (8 g) obtained in Example 2 was poured into the container shown in FIG. 1, and the composition was exposed to UV at 20 mW/cm$^2$ for 2 seconds by the exposure system used in Example 1. This reaction mixture was allowed to stand for 1 hour at room temperature, and the composition B was observed for its curing. The part covered by the aluminum plate which was not exposed to UV remained uncured while the UV-exposed part on the aluminum plate was cured. The cured part had a hardness (measured by IRHD hardness tester Supersoft) of 73.

Japanese Patent Application No. 2011-229118 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for curing an addition curable organopolysiloxane composition comprising
   (A) an organopolysiloxane having at least 2 alkenyl groups bonded to silicon atoms per molecule,
   (B) an organohydrogenpolysiloxane having at least 2 hydrogen atoms bonded to silicon atoms per molecule at an amount such that 0.4 to 10 hydrogen atoms bonded to silicon atoms of this component are present per one alkenyl group in the organopolysiloxane of the component (A), and
   (C) an effective amount of a platinum complex curing catalyst selected from the group consisting of
   trimethyl(acetylacetonato)platinum complex,
   trimethyl(2,4-pentanedionato)platinum complex,
   trimethyl(3,5-heptanedionato)platinum complex,
   trimethyl(methylacetoacetato)platinum complex,
   bis(2,4-pentanedionato)platinum complex,
   bis(2,4-hexanedionato)platinum complex,
   bis(2,4-heptanedionato)platinum complex, and
   bis(3,5-heptanedionato)platinum complex, the method comprising
   the first step of exposing the composition to UV light having a wavelength of 200 to 400 nanometers at an intensity of 20 to 400 mW/cm$^2$ for 1 second to 1 minute to increase catalytic activity of the component (C) while maintaining a liquid state of the composition, and
   the second step of applying the composition obtained in the first step to desired parts by potting and curing the composition.

* * * * *